May 22, 1934.　　　　C. H. HAPGOOD　　　　1,959,716
COW MILKING APPARATUS
Filed Oct. 7, 1931　　　4 Sheets-Sheet 1
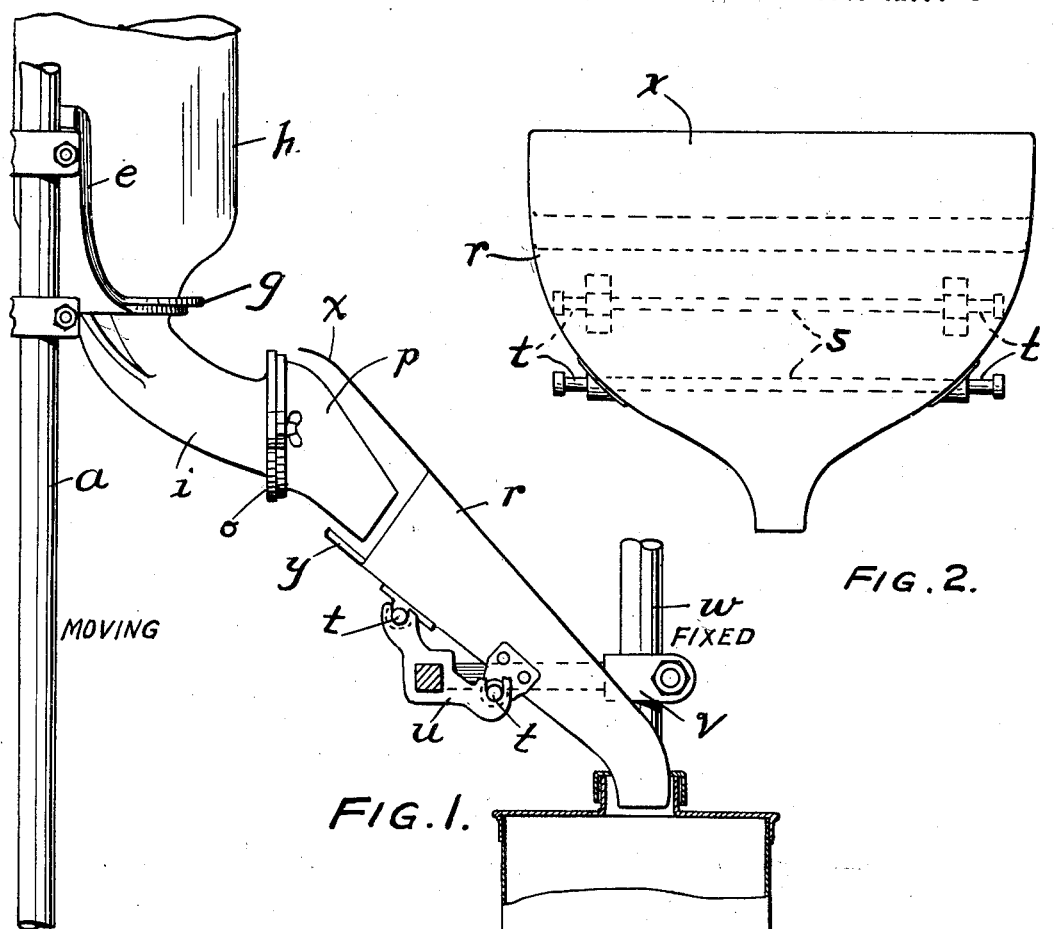
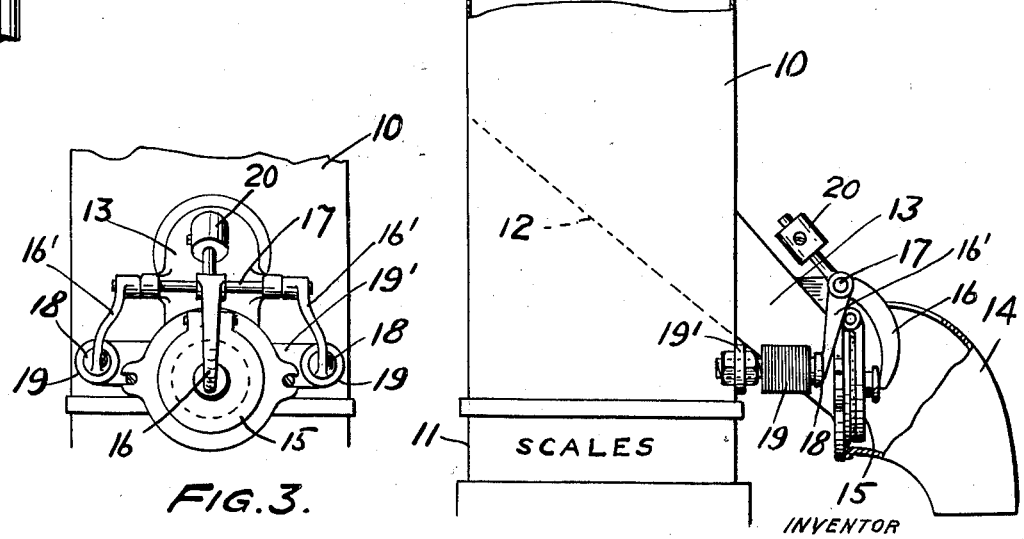
INVENTOR
Cyrus Howard Hapgood
BY
Busser and Hardwig
ATTORNEYS.

May 22, 1934.  C. H. HAPGOOD  1,959,716
COW MILKING APPARATUS
Filed Oct. 7, 1931   4 Sheets-Sheet 2
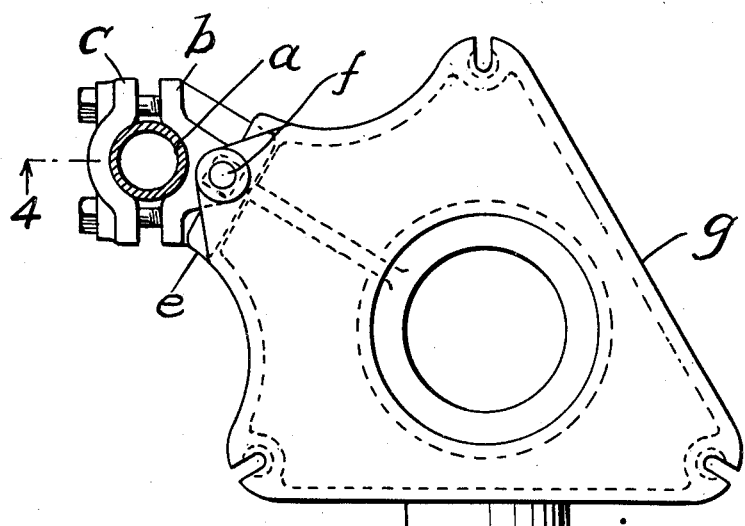
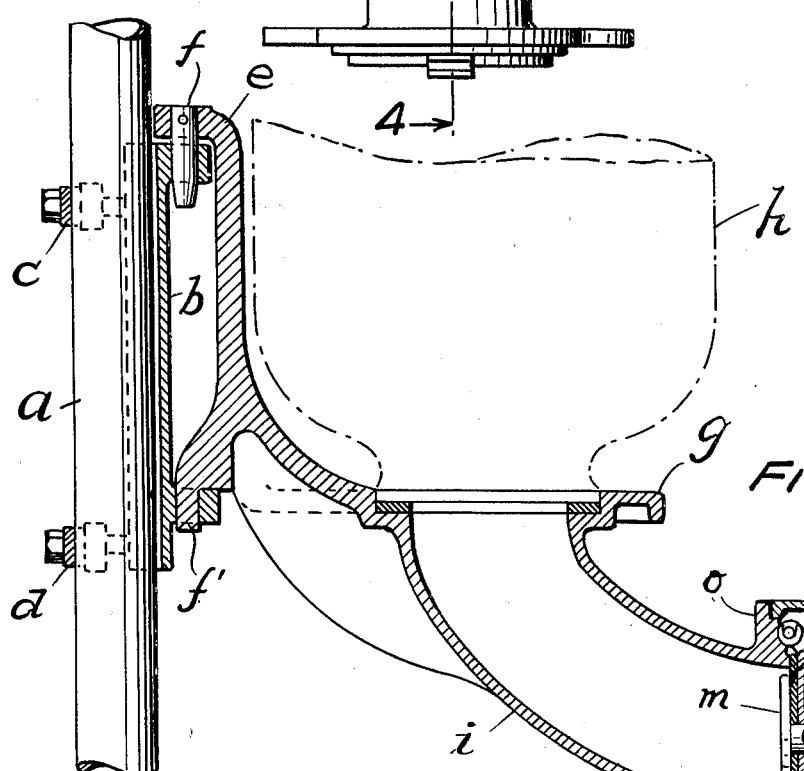
WITNESS:
R.H.R.Kitchel.
INVENTOR
Cyrus Howard Hapgood
BY Buser and Hardwig
ATTORNEYS.

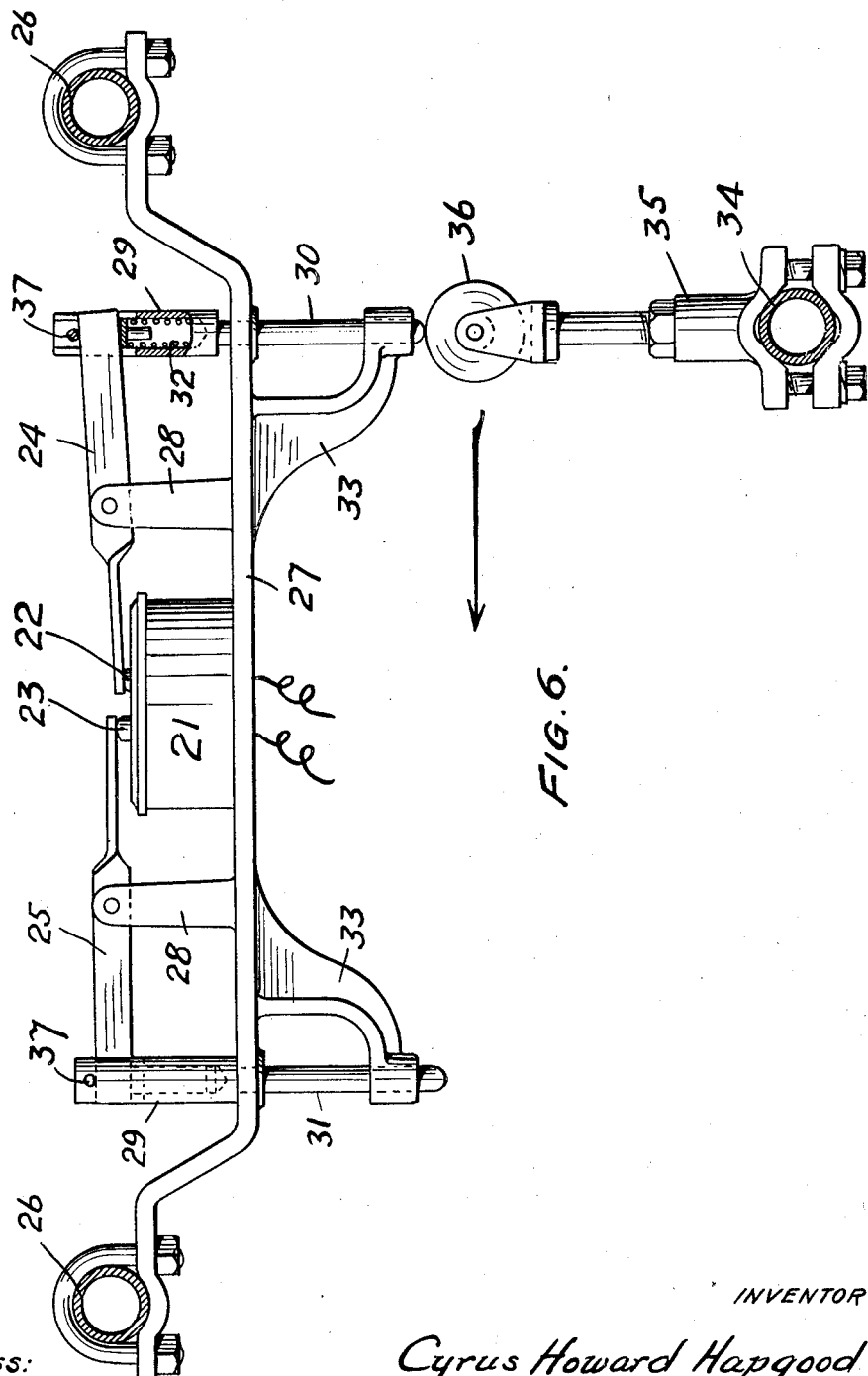

May 22, 1934.  C. H. HAPGOOD  1,959,716
COW MILKING APPARATUS
Filed Oct. 7, 1931  4 Sheets-Sheet 4

WITNESS:

INVENTOR
Cyrus Howard Hapgood
BY
ATTORNEYS.

Patented May 22, 1934

1,959,716

UNITED STATES PATENT OFFICE 1,959,716

COW-MILKING APPARATUS

Cyrus Howard Hapgood, Nutley, N. J., assignor to The De Laval Separator Company, New York, N. Y., a corporation of New Jersey Application October 7, 1931, Serial No. 567,337

6 Claims. (Cl. 31—82)

In a patent issued to me December 30, 1930, No. 1,787,152, I disclose a cow-milking apparatus comprising a rotatable platform onto which, during its rotation, the cows walk one by one, and are successively milked, the cows thereafter leaving the platform, one by one, as the platform continues to rotate. The milking machinery comprises a number of spaced apart milking units carried by, and arranged around the periphery of, the platform, and also a number of fixed devices which, as the milking units rotate with the platform, successively co-operate with the milking units and render them successively operative. Each milking unit, when in operation, is operatively connected with an individual cow and comprises, in addition to the mechanism for effecting the milking, a pail to receive the milk from such individual cow. After the milking of a cow is completed, the corresponding pail is brought opposite a fixed weigh tank, at which time means operate to effect the discharge of the milk into the tank. After the weight is noted, the milk is discharged into a receiver.

The object of the present invention is to improve such part of the described mechanism as relates to the discharge of the milk from the pail to the weigh tank and from the weigh tank to the receiver.

A preferred embodiment of the invention is shown in the drawings, wherein:

Fig. 1 is a side view of the bottom of the movable pail, the fixed weigh tank, the means to deliver milk from the pail to the weigh tank and the means controlling the discharge of milk from the weigh tank to the receiver.

Fig. 2 is an elevation of the milk delivery funnel between the pail and the weigh tank.

Fig. 3 is a face view of the means controlling the discharge of milk from the weigh tank to the receiver.

Fig. 4 is a sectional elevation on line 4—4 Figure 5 of the means for supporting the pail including the conduit for discharging the milk therefrom.

Fig. 5 is a plan view of the means shown in Fig. 4.

Fig. 6 is an elevation of part of the electrically actuated means for controlling the discharge of milk from the weigh tank.

Figure 7:
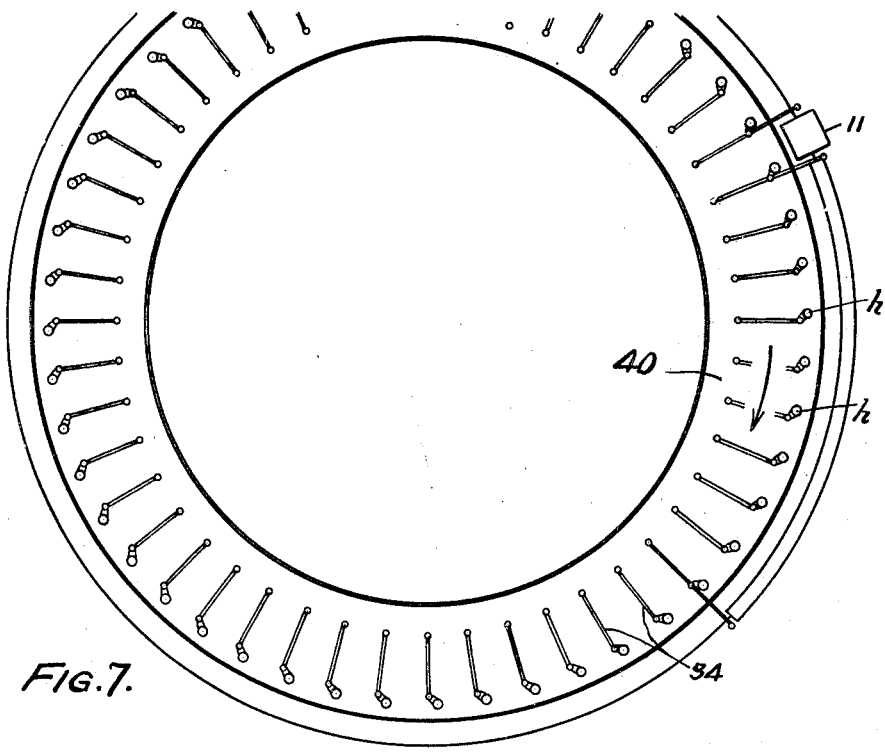
Fig. 7 is a plan view of the rotatable platform carrying the milking machine units.

A rotatable circular platform 40 is provided with a circular beam 41 having a circular track 42 resting on rollers 43. The platform is continuously and slowly rotated by any suitable driving means. During such rotation the cows walk onto the platform, one by one, into successive stalls, are successively milked, and walk off, one by one, as more fully explained in Hapgood Patent No. 1,781,152.

Carried by the rotatable platform are a series of frames forming the stalls, these frames including posts $a$ and cross rails 34. Each post $a$ (see Figs. 4 and 5) has members $b$, $c$ and $d$ clamped thereon. Each hanger $e$ is immovably supported on clamp $b$ by means of pin $f$ and a rectangular lug $f'$ on the hanger seating in holes in flanges projecting from clamp $b$. Each hanger comprises a plate $g$ having an opening surrounded by a recess affording a seat for a milk pail $h$ (the lower end of which is shown in broken lines).

A discharge conduit $i$ extends downward from each of said openings and is curved so that its discharge end extends laterally.

Swingably suspended on the discharge end of each conduit $i$ is a gate adapted to close the conduit while the milk pail is under vacuum. The gate comprises a disc $k$, a button $m$ having a central neck extending through a central boss on disc $k$, an annular elastic washer $n$, of about the same diameter as the disc, confined between the head of the button and the disc, and a screw $q$ threaded into the neck of the button and having a head engaging the boss on the disc whereby the washer is held as specified.

During delivery of the milk to a pail the pail is under vacuum and the gate is held closed by pressure of the atmosphere. When, at the conclusion of milking, the pail is disconnected from vacuum and air is admitted at the top thereof, the weight of the milk opens the gate and the milk is discharged therethrough. Heretofore, much difficulty has been experienced in securing an air-tight closure of the gate. The construction just described affords such a closure. The washer $n$ may be readily removed by removing screw $q$ and then button $m$ and may be readily replaced, or a new washer substituted.

Figure 8:
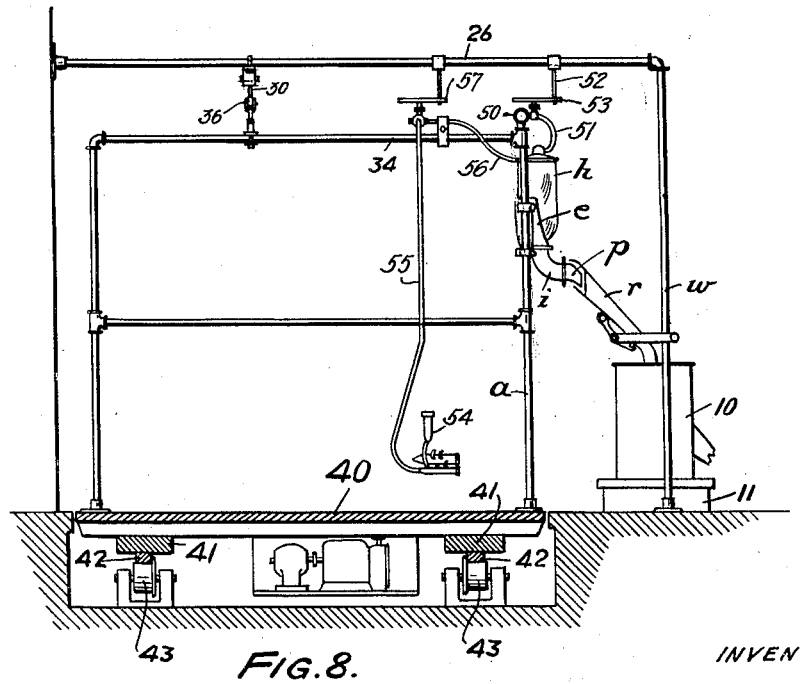
Fig. 8 is a sectional view through the rotatable platform and a stationary weigh tank adjacent thereto, the view also showing one of the milk pails, its supporting cross frame and the means for delivering milk from a pail to the weigh tank.

Means whereby, during the delivery of milk to a pail, it is held under vacuum and whereby, at the conclusion of milking, the pail is disconnected from vacuum, are fully described and shown in my said prior Patent No. 1,787,152, and need not be herein described in detail. Briefly, it may be stated that, to begin milking a cow, a stationary actuator 52 (see Fig. 8) turns a wheel 53 (traveling with platform 40), which turns a valve to open connection between a vacuum pipe line 50 and a hose 51 communicating with a milk pail $h$, whereby the gate at the end of conduit $i$ is held closed by pressure of the atmosphere. At about the same time a wheel 57 is turned to operate a valve to open connection from the teat cups 54, through milk pipe 55 and hose 56, to the milk pail $h$. At the conclusion of milking the wheel 57 is turned to close the connection, through milk pipe 55 and hose 56, from the teat cups to the milk pail, and another actuator 52 turns wheel 53 to close connection between vacuum pipe 50 and hose 51 and open connection from the atmosphere, through hose 51, to the milk pail, whereby the weight of the milk opens the gate at the end of conduit $i$ and the milk is discharged.

Any means for producing the necessary pneumatic pressure changes in the pail may be utilized. The patent hereinbefore cited discloses preferred means for effecting this operation.

The discharge end of conduit $i$ is provided with a surrounding stepped annular flange $o$, against one of the annular shoulders, whereof is secured a spout $p$ (see Fig. 1) through which the milk is discharged into the funnel $r$.

Between the weigh tank 10 and the spout $p$ is fixedly positioned said funnel. It has a wide receiving mouth and a narrow discharge opening fitting into a neck on the top of the weigh tank. It must be remembered that the weigh tank 10 and the funnel $r$ are fixed while the pail and its discharge conduit and spout are slowly but continually moving. The receiving mouth of the funnel $r$ is so positioned that the spout is opposite one end of the mouth when the gate $k, m, n, q$ is first opened and is opposite the other end of the mouth when the gate is subsequently closed. During this interval the discharge of milk from the pail is effected. The receiving mouth of the funnel $r$ must therefore be made of sufficient width to allow the pail to be completely emptied of milk while the pail is moving a distance less than the extreme width of such mouth.

The funnel $r$ has secured to its inclined bottom two spaced apart laterally extending rods $s$ having necks $t$ adapted to engage recesses in spaced apart brackets $u$ carried on arms $v$ clamped on posts $w$. This construction allows the ready removal for cleaning of funnel $r$ and its ready replacement, and also insures that it will be replaced in its proper working position, without lateral deviation.

In order to protect the funnel $r$ against the dropping thereinto from above of any foreign material, it is provided with a shield $x$ which overhangs the spout $p$. In order to prevent the escape of milk during its flow from the spout $p$ into the funnel $r$, the latter is provided with a flange $y$ underlying the spout.

The weigh tank 10, mounted on scales 11, is provided with an inclined false bottom 12 aligning with the bottom of a spout 13 through which the milk is discharged into a common receiver (not shown). The discharge from spout 13 is controlled by a gate 15, which may be similar in construction to gate $k, m, n, q$. Spout 13 may be provided, like conduit $i$, with an other spout 14 for delivery to the receiver above mentioned.

This gate 15 is held closed during the inflow of milk with tank 10 and is opened after such inflow of milk has been completed and after the operator has had time to note the weight of the milk. The gate is normally held closed by means of an arm 16 on a shaft 17 turning in bearings carried by spout 13. Arms 16' on opposite ends of shaft 17 carry the armatures 18 of magnets 19, the magnetic circuit through which is closed by the connecting bar 19'. The magnetic circuit comprises the core of one magnet 19 and its armature 18, shaft 17, the other armature 18 and the core of the other magnet 19 and the connecting bar 19'. When an electric circuit is closed through the magnets, gate 15 is held closed, as shown in Fig. 1. When the circuit is opened through the magnets, the weight of the milk opens the gate, the weight 20 counterbalancing the weight of the arms 16, 16'.

In Fig. 6 is shown an automatic circuit maker and breaker. A switch box 21, which may be of standard type, is provided with two pins, one, 22, of which, when depressed, opens the circuit and raises the other pin 23; the latter, when depressed, closing the circuit and raising pin 22. Secured between fixed rails 26, 26 is a cross-bar 27 having brackets 28, 28, on which, between their ends, are respectively pivoted levers 24 and 25, the inner ends of which engage respectively pins 22 and 23. The outer end of each lever extends between forks at the upper end of a cup 29. From the cups 29 depend pins 30 and 31, vertically slidable in bar 27 and in brackets 33 carried thereby. Within each cup 29 is a spring 32. A cross-pin 37 between the upper extremities of the forks of each cup limits the upward movement of the outer end of the corresponding lever 24 or 25.

Carried on the movable platform 40 hereinbefore mentioned are a series of spaced apart switch controllers corresponding in number to the milking units. One of these switch controllers is shown in Fig. 6. It comprises a bracket 35, clamped to a rail 34 of the rotatable platform, and a roller 36 positioned to successively engage pins 30 and 31.

A sufficient time after milk is delivered to the weigh tank 10 to enable its weight to be noted, roller 36 engages and lifts pin 30, thereby lifting the corresponding cup 29 and, through spring 32, moving lever 24 into the position shown in Fig. 6, depressing pin 22, lifting pin 23 and opening the circuit through magnets 19. Thereupon gate 15 swings open and milk is discharged from the weigh tank. Shortly thereafter roller 36 engages and effects the lifting of pin 31, thereby depressing the inner end of lever 25, depressing pin 23, lifting pin 22, and closing the circuit through magnets 19, thereby closing gate 15. In case roller 36 should lift pin 30 unnecessarily high, the resistance afforded by pin 22 to further downward movement would be taken up by compression of spring 32.

Having now fully described my invention, what I claim and desire to protect by Letters Patent is:

1. In a cow-milking machine, the combination with a receptacle adapted to receive milk at intervals, a gate adapted to control the discharge of milk from the receptacle, an electro-magnet, an armature, a lever carrying the armature, a gate-closing member connected with said lever, said lever being operable, when the armature is attracted by the magnet, to move said gate-closing member into position to close the gate, and means to alternately open and close the circuit through the magnet.

2. In a cow-milking machine, the combination with a receptacle adapted to receive milk at intervals, a gate adapted to control the discharge of milk from the receptacle, electro-magnets on opposite sides of said discharge opening, armatures for the respective magnets, levers carrying said armatures, an arm between, and connected with, said levers and adapted, when said magnets are energized and said armatures are drawn theretoward, to be swung into position to hold said gate closed, and means to alternately open and close the circuit through both magnets simultaneously.

3. In a cow-milking machine having a movable support and means for moving said support, the combination with a pail mounted on said support and adapted to alternately receive and discharge milk, a stationary weigh tank adapted to receive milk discharged from the pail, a gate controlling the discharge of milk from the weigh tank, an electro-magnet and a circuit connected thereto adapted to control the opening and closing of said gate, and means to alternately open and close the circuit through said magnet, said means comprising a device mounted on said support and movable with the pail and switch mechanism operable by said device.

4. In a cow-milking machine having a movable support and means for moving said support, the combination with a pail mounted on said support, of a gate and means to open it at intervals and allow the discharge of milk from the pail, a spout beyond said gate through which the milk is discharged, a stationary tank, a stationary funnel between the spout and the tank, said funnel having a wide receiving mouth, stationary brackets, two spaced-apart rods secured to and extending laterally of the inclined bottom of the funnel, and coacting means on said brackets and rods adapted to removably and replaceably support said funnel and at the same time accurately position it relative to the spout and tank.

5. In a cow-milking machine having a movable support and means for moving said support, the combination with a series of pails mounted on said support, means adapted to effect the discharge of milk from said pails successively, and a stationary weigh tank adapted to receive milk discharged from successive pails, of devices mounted on said support and movable with the pails, and means operable by said devices and effecting the intermittent discharge of milk from said tank.

6. In a cow-milking machine having a movable support and means for moving said support, the combination with a series of pails mounted on said support, means adapted to effect the discharge of milk from said pails successively, and a stationary weigh tank adapted to receive milk discharged from successive pails, of devices mounted on said support and movable with the pails, a gate controlling the discharge of milk from the weigh tank, an electromagnet and a circuit connected thereto adapted to control the opening and closing of said gate, and means to open and close the circuit through the magnet including switch mechanism intermittently operable by said devices.

CYRUS HOWARD HAPGOOD.